Feb. 6, 1968  A. P. KIZILOS ET AL  3,367,581

CONTROL APPARATUS UTILIZING A FLUID AMPLIFIER

Filed Oct. 23, 1965

INVENTORS
APOSTOLOS P. KIZILOS
RICHARD J. REILLY
BY
ATTORNEY

United States Patent Office 3,367,581
Patented Feb. 6, 1968

3,367,581
CONTROL APPARATUS UTILIZING A
FLUID AMPLIFIER
Apostolos P. Kizilos, Minneapolis, and Richard J. Reilly, St. Paul, Minn., assignors to Honeywell Inc., Minneapolis, Minn., a corporation of Delaware
Filed Oct. 23, 1965, Ser. No. 503,306
4 Claims. (Cl. 239—520)

ABSTRACT OF THE DISCLOSURE

A control system having a fluid amplifier for controlling the direction at which two combined fluid streams exhaust from a control surface.

This invention pertains to the field of fluid technology, and more particularly to a fluid control device.

Since the discovery of fluid amplifiers in approximately 1960, there has been a rapid development of fluid devices having no moving parts other than the fluid. There have been devices developed for amplifying, monitoring, sensing as well as metering fluid signals. The applicants have, however, developed a fluid control device that allows one to control the direction of a fluid stream by varying the relative strengths of two fluid streams.

It is known in the prior art that a fluid stream when directed tangentially to a convex curved surface attaches to the surface. The attachment of the fluid stream to a surface of this kind is attributed to the phenomenon of entrainment, which will be described in greater detail later. If one has ever placed a finger adjacent to a fluid stream from a faucet, the tendency of the fluid stream to wrap around the finger has probably been noted. Such attachment to a surface by a fluid stream has been known, but the following method of controlling the direction at which the fluid stream exhausts from the surface has not. It is the discovery by the applicants of how to control the direction of the fluid stream exhausts from the surface that is the heart of the present invention. The applicants achieve their control by introducing tangentially two fluid streams at spaced points on a cylindrical surface so directed as to intersect, thereby causing the streams to exhaust as a single fluid stream, whose direction can be controlled by controlling the two initial streams.

Briefly, the present invention offers a unique way for controlling the direction, and thus the thrust vector, of a fluid stream emerging from a body by varying the strengths of two streams. A first fluid stream is directed into an ambient fluid in a direction substantially tangent to a cylindrical surface, and unequal entrainment of the fluid occurs on opposite sides of the fluid stream. The unequal entrainment causes a pressure differential to be established and forces the fluid stream to adhere to the surface and flow along the surface in a curved path. Similarly, a second fluid stream is directed so that it also adheres to the surface and flows in a curved path in a direction opposite that of the first stream. When the two fluid streams flow together on the surface, a single stream is formed which flows outward from the surface in a direction determined by the relative momenta, or strengths, of the first and second fluid streams. Normally, both of these streams have enough momentum to wrap around the entire surface, however, each one is prevented from doing so by the other. If the momentum of the two fluid streams are equal, the single fluid stream will exhaust midway between the spaced points on the surface where fluid is introduced. It is the control of this single stream by varying the relative strengths of the first and second streams that is the applicants' new fluid control device.

The applicants' fluid control device has particular utility as a deflecting mechanism for a fluid stream, and also for performing a jet-flap like function when installed in an airfoil. When the applicants' fluid control device is installed in an airfoil, it offers unique advantage over other prior jet-flap controls since the present invention has no moving parts other than the fluid. In contrast, prior art jet-flaps, although they have increased the lift of an airfoil, have also correspondingly increased the drag. This is an undesirable characteristic, since the increased drag force must be compensated by supplying more fuel to the engine.

When the applicants' fluid control device is installed as a jet-flap-like control device, not only is additional lift achieved in the airfoil through the momentum of the fluid stream exhausting from the airfoil, but the lift of the airfoil is increased because of the greater circulation around the airfoil.

The functioning of the applicants' device will become apparent when viewed in connection with the drawings, in which.

Figure 1:
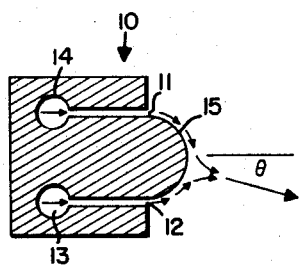
FIGURE 1 is a cross-sectional view of the applicants' invention.
Figure 2:
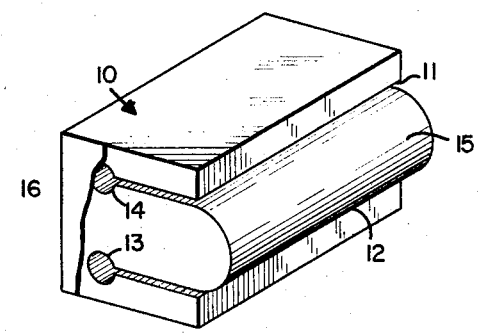
FIGURE 2 is an oblique view of applicants' invention.

Referring to FIGURE 1 and FIGURE 2, reference numeral 10 generally depicts the housing for applicants' fluid control device. A pair of elongated slits or nozzles 11 and 12 are provided in housing 10. Two plenum chambers 13 and 14 are supplied for introducing fluid into nozzles 12 and 11 respectively. Projecting from housing 10 is a member with a surface 15, for fluid to flow on. Surface 15 is shown as circular but may also be elongated or any other shape which allows the fluid to flow thereon.

A cutaway portion of an end section 16 is also shown in FIGURE 2.

Figure 3:
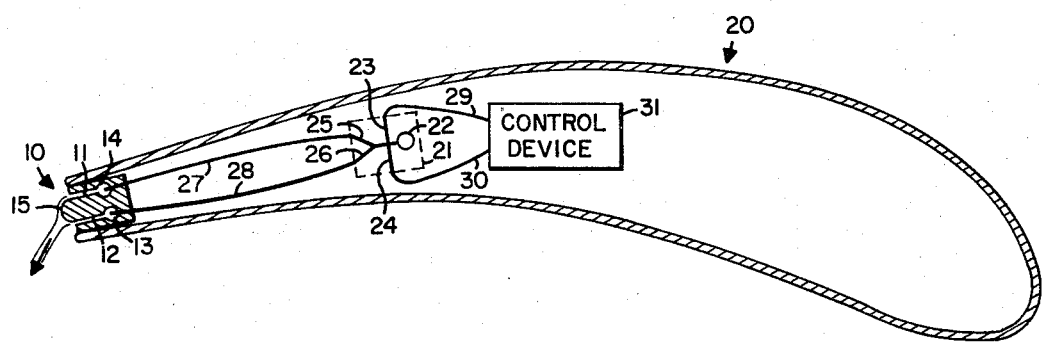
FIGURE 3 shows applicants' invention embodied in an airfoil.

Referring to FIGURE 3, reference numeral 20 generally designates an airfoil member. Applicants' fluid control device 10 is shown in cross-section at the trailing edge of airfoil 20. A fluid proportional amplifier of the momentum type is designated by reference numeral 21.

Amplifier 21 has a power supply nozzle 22, a first control port 23 and a second control port 24, and a first output leg 25 and a second output leg 26. The output legs 25 and 26 are connected to plenum chambers 14 and 13 of fluid amplifier 10, by conduits 27 and 28 respectively. The control ports 23 and 24 of fluid amplifier 21 are connected by conduits 29 and 30 respectively to a control device 31. The control device may be a manual pressure differential generator, or a fluid device such as disclosed in the patent of Richard J. Reilly, 3,340,737 and assigned to the same assignee as the present invention.

In normal operation of the applicants' fluid control device, fluid is supplied to plenum chambers 13 and 14. The fluid in plenum chamber 14 flows into the elongated nozzle 11 and outward along surface 15. Similarly, the fluid in plenum chamber 13 flows into elongated nozzle 12 and along surface 15. Although uniform nozzles of rectangular cross-section are shown and described, it is apparent that other nozzle shapes, such as convergent or convergent-divergent of circular, square, cross-sections may be equally well used. Normally, with no surface 15 located adjacent to the fluid stream emanating from fluid nozzle 11, the fluid stream would flow in a straight path out of elongated nozzle 11. However, due to the pressure differential that exists across the stream produced by the differential fluid entrainment, the fluid stream adheres to the surface 15 as it flows out elongated nozzle 11. The entrainment is caused by the fluid stream spreading out as it leaves the nozzle and accelerating quiescent or ambient fluid particles adjacent to the fluid stream. By accelerating the fluid particles, the local fluid velocity decreases resulting in regions of increased pressure in the outer portion of the stream. Since a surface 15 is immediately adjacent to the nozzle 11, there is a limited amount of fluid that can be entrained on the lower portion of the fluid stream. Consequently, the pressure remains lower because the fluid stream needs only to overcome boundary layer losses on the surface 15. However, adjacent to the outer portions of the stream emanating from the nozzle 11, there is a greater interaction with the surrounding fluid resulting in a diffusion of the jet. The resulting pressure difference across the jet causes the fluid to wrap around the surface 15 and continues around the surface 15 until the pressure difference supporting the curved flow is equalized by natural diffusion processes and the fluid stream separates from the surface 15. In the applicants' invention, the separation is made to occur in a controlled fashion through the influence of a second jet from nozzle 12 which also adheres to surface 15 and travels in a similar manner around the surface 15.

When the two fluid streams emanating from nozzles 11 and 12 flow around the surface 15, they collide and exhaust at some angle indicated by $\theta$ in FIGURE 1. The angle of the exhausting fluid stream $\theta$ is proportional to the ratio of the strengths of the fluid streams emanating from nozzles 11 and 12. It can be appreciated that the direction of the exhausting stream from surface 15 is the same as the axis at the thrust vector generated by the fluid stream. In other words, the variation of the direction of fluid stream emanating from surface 15 will also vary the direction of the force of the fluid on the fluid control device. Hence, applicants' device may be called a variable deflection thruster. It will be noted that in the drawing, the nozzles are placed parallel to each other, however, it can be appreciated that they need not be parallel but may be at acute or obtuse angles to one another since a single stream will wrap around a surface more than 180 degrees.

In FIGURE 3, a particular application of the present invention is shown. In this application, the fluid control device 10 serves the same function as an aileron or jet-flap on airfoil 20 would; namely, varying the coefficient of lift for the airfoil by changing the amount of circulation around airfoil 20 and by varying the direction of the thrusting stream without the use of any movable mechanical parts.

In normal operation, a signal from control device 31 causes the output of fluid amplifier 21 to vary. That is, fluid amplifier 21 is a proportional fluid amplifier in which a net differential pressure signal across pressure ports 23 and 24 causes a larger net pressure differential signal across output legs 25 and 26. Thus, fluid amplifier 21 serves as a force amplifier for a small signal generated in control device 31. Obviously, if the signal generated in control device 31 were large, it would not be necessary to use the amplification 21 indicated in FIGURE 3.

Suppose a control signal of one p.s.i. differential is generated by control device 31 in control ports 23 and 24 with control port 24 having the higher pressure. Assuming a pressure gain of 10 in the fluid amplifier 21, a pressure differential of 10 p.s.i. exists across output legs 25 and 26. In other words, output leg 25 has a 10 p.s.i. signal greater than output leg 26. This pressure differential signal is transmitted through conduits 27 and 28 to the two plenum chambers 14 and 13 of fluid control device 10. Thus, the fluid emanating from nozzle 11 of FIGURE 3 has the greater amount of momentum associated with it causing it to wrap downward around surface 15 as shown in the diagram. Since there is relatively little force associated with the stream flowing through nozzle 12, there is a small amount of momentum to counteract the large momentum of the fluid emanating from nozzle 11. As a result, the combined fluid streams emanate in a downward direction as indicated by the arrow in FIGURE 3. It can be appreciated, when the fluid exhausts downward in this manner, a force is created on the airfoil, similarly as a force would be generated by having a movable flap in the rearward portion of an airfoil.

The applicants have shown a use for their device in control of an airfoil. It would also be apparent that an aileron could be used along with applicants' fluid control device and the combination used to vary lift to the airfoil.

While we have shown and described a particular embodiment in our invention, variations of our invention will become obvious to those skilled in the art, therefore, we wish it to be understood that we intend only to be limited by the appending claims.

We claim:
1. A system including:
a control device;
fluid amplifier means connected to said control device and responsive to signals from said control device;
a fluid control device for a vehicle including a plurality of fluid nozzles, and a surface located between said nozzles so that at least one of said nozzles is on an opposite side of said surface from another of said nozzles; and
means connected to said fluid amplifier means for supplying fluid to said nozzles whereby the direction of the fluid stream exhausting from said surface varies proportionally to the point of impingement of fluid from said nozzles.

2. Apparatus of the class described comprising, in combination:
a member having a convex curved surface;
a first elongated nozzle arranged for issuing a first sheet of fluid to attach to said surface and flow therearound in a first direction;
a second elongated nozzle spaced around said surface from said first nozzle and arranged for issuing a second sheet of fluid to attach to said surface and flow therearound in a direction opposite to that of said first sheet, so that said sheets impinge on one another and exhaust from said surface at a location, between said nozzles, determined by the relative strengths of said sheets;
a first plenum chamber in fluid communication with said elongated nozzles;
a second plenum chamber in fluid communication with said second nozzle;
a proportional fluid amplifier including a power nozzle for issuing a fluid stream, first and second output ports for receiving said fluid stream, and control means for determining the direction of flow of said stream relative to said output ports;
means connecting said first and second output ports to said first and second plenum chambers respectively to provide fluid thereto; and
a control device for supplying a fluid signal to said control means to vary the respective proportions of said fluid stream flowing from said power nozzle through said first and said second output ports, plenum chambers, and nozzles, whereby to determine the location of the detachment of said fluid sheets from said surface.

3. Apparatus of the class described comprising in combination:
proportional fluid amplifier means;
said fluid amplifier means including a power nozzle for issuing a fluid stream, fluid actuated control means for deflecting the fluid stream, a first fluid output port and a second fluid output port in said fluid amplifier means for receiving the fluid stream issuing from said power nozzle;
housing means;
a first nozzle for issuing a first fluid output stream, a second nozzle for issuing a second fluid output stream;

a surface projecting between said first nozzle and said second nozzle, said surface forming a portion of said first nozzle and a portion of said second nozzle;

a first fluid plenum chamber in said housing means in fluid communication with said first nozzle to thereby allow the fluid to flow from said first plenum chamber into said first nozzle;

a second fluid plenum chamber in said housing means in fluid communication with said second nozzle to thereby allow the fluid to flow from said second plenum chamber into said second nozzle; and means connecting said first output port to said first plenum chamber and means connecting said second output port to said second plenum chamber, so that when a different control signal is applied to said fluid amplifier control means the fluid power stream is proportionally divided between said first nozzle and said second nozzle to thereby affect the point of impingement of the first fluid output stream and the second fluid output stream.

4. The apparatus of claim 3 wherein a control device is provided for supplying a signal to said fluid amplifier control means.

References Cited
UNITED STATES PATENTS 3,062,483  11/1962  Davidson _____ 244—42
3,066,894  12/1962  Davidson _____ 244—42 X M. HENSON WOOD, Jr., *Primary Examiner.*

VAN C. WILKS, *Assistant Examiner.*